(12) United States Patent
Ghodsi et al.

(10) Patent No.: US 10,474,501 B2
(45) Date of Patent: Nov. 12, 2019

(54) SERVERLESS EXECUTION OF CODE USING CLUSTER RESOURCES

(71) Applicant: Databricks Inc., San Francisco, CA (US)

(72) Inventors: Ali Ghodsi, Berkeley, CA (US); Srinath Shankar, Belmont, CA (US); Sameer Paranjpye, Cupertino, CA (US); Shi Xin, San Francisco, CA (US); Matei Zaharia, Palo Alto, CA (US)

(73) Assignee: Databricks Inc., San Francisco, CA (US)

( * ) Notice: Subject to any disclaimer, the term of this patent is extended or adjusted under 35 U.S.C. 154(b) by 80 days.

(21) Appl. No.: 15/581,987

(22) Filed: Apr. 28, 2017

(65) Prior Publication Data
US 2018/0314556 A1    Nov. 1, 2018

(51) Int. Cl.
*G06F 9/50*    (2006.01)

(52) U.S. Cl.
CPC ...... *G06F 9/5005* (2013.01); *G06F 2209/505* (2013.01); *G06F 2209/5011* (2013.01)

(58) Field of Classification Search
CPC .................................................. G06F 9/5005
See application file for complete search history.

(56) References Cited

U.S. PATENT DOCUMENTS

| | | | |
|---|---|---|---|
| 8,352,608 B1* | 1/2013 | Keagy ........................ | G06F 8/63 709/226 |
| 2006/0090162 A1* | 4/2006 | Flores ..................... | G06F 8/656 718/104 |
| 2009/0144741 A1* | 6/2009 | Tsuda .................... | G06F 9/5027 718/104 |
| 2011/0016214 A1* | 1/2011 | Jackson ................ | G06F 9/5044 709/226 |

* cited by examiner

*Primary Examiner* — Sisley N Kim
(74) *Attorney, Agent, or Firm* — Van Pelt, Yi & James LLP

(57) ABSTRACT

A system for cluster resource allocation includes an interface and a processor. The interface is configured to receive a process and input data. The processor is configured to determine an estimate for resources required for the process to process the input data; determine existing available resources in a cluster for running the process; determine whether the existing available resources are sufficient for running the process; in the event it is determined that the existing available resources are not sufficient for running the process, indicate to add new resources; determine an allocated share of resources in the cluster for running the process; and cause execution of the process using the share of resources.

22 Claims, 7 Drawing Sheets

SERVERLESS EXECUTION OF CODE USING CLUSTER RESOURCES

BACKGROUND OF THE INVENTION

In a traditional cluster computing application, cluster computing users request computing jobs by configuring a cluster computing server to run the job with a desired level of resources. Most users do not know the level of resources required by their job and thus request more resources than are required by the job. This results in unnecessary allocation of the cluster capacity and reduction of the overall usage of the cluster.

BRIEF DESCRIPTION OF THE DRAWINGS

Various embodiments of the invention are disclosed in the following detailed description and the accompanying drawings.

DETAILED DESCRIPTION

Figure 1:
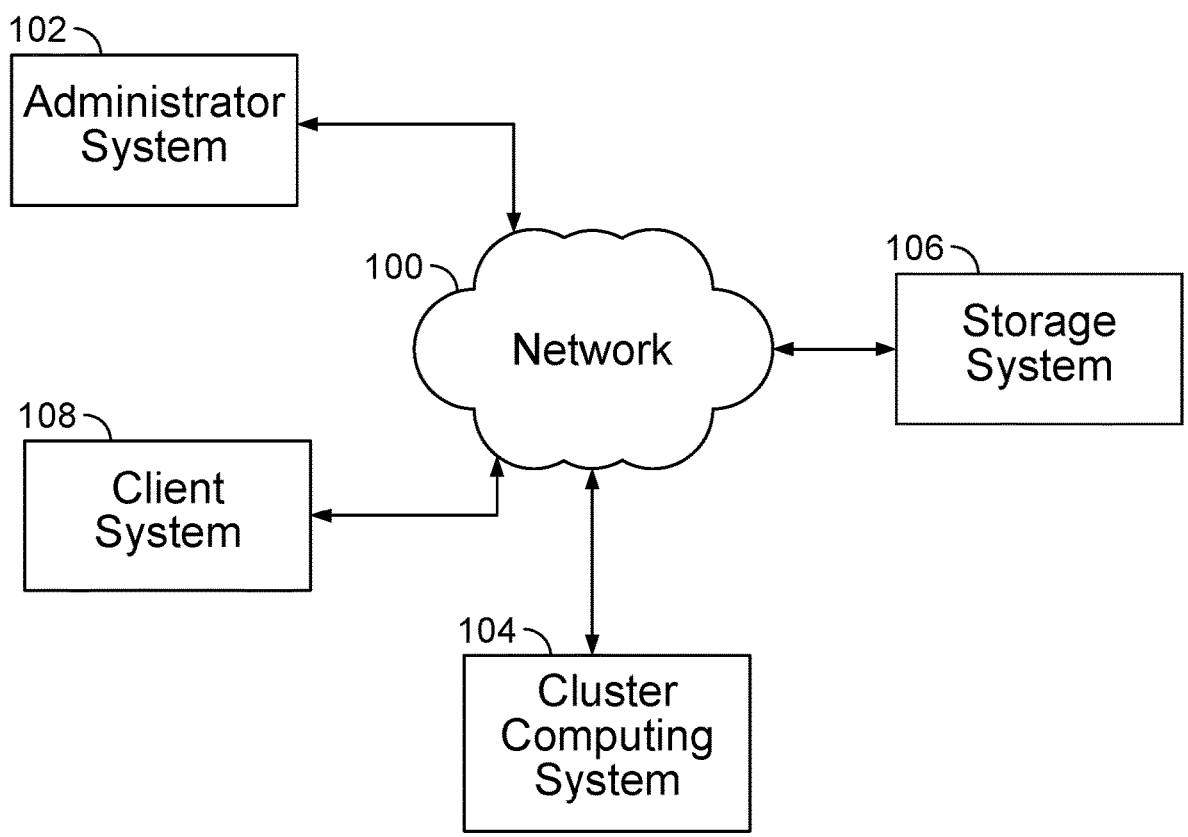
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for cluster resource allocation is disclosed. The system includes an interface and a processor. The interface is configured to receive a process and input data. The processor is configured to determine an estimate for resources required for the process to process the input data, determine existing available resources in a cluster for running the process, determine whether the existing available resources are sufficient for running the process, indicate to add new resources in the event it is determined that the existing available resources are not sufficient for running the process, determine an allocated share of resources in the cluster for running the process, and cause execution of the process using the share of resources.

In some embodiments, a system for cluster resource allocation comprises a system for determining resources to allocate to a cluster computing job. The system for cluster resource allocation determines an estimate for resources required for the job and indicates to add resources to the cluster in the event that the required resources are not available. The system for cluster resource allocation then allocates a share of resources to the process or job according to a predetermined allocation and monitors the usage of resources in order to reallocate, if necessary. In some embodiments, the system determines whether existing available resources allocated to a process or job are more than necessary for running the process or job and, in the event that it is determined that there are more than necessary resources, resources are reduced. In various embodiments, determining whether there are more than necessary resources comprises one or more of the following: determining that over a period of time resources used by the process or job are below a threshold percentage of the allocated resources, are below an estimated number of resources required by the process or job, are below the specified number of resources indicated by the process or job, or any other appropriate determination criterion.

In some embodiments, in the event that a job is requested, the system for cluster resource allocation automatically determines a driver system to manage the job. A driver system comprises a cluster master system for coordinating the execution of the job among a set of worker systems. In various embodiments, a driver system is associated with a user of a cluster system, a driver system is associated with a customer, a plurality of driver systems is associated with a user or customer, driver systems are shared between users or customers, or driver systems are divided between job requestors in any other appropriate way. In some embodiments, each driver system is associated with a cluster of worker systems and the worker systems are not shared between drivers. In some embodiments, all driver systems allocate jobs to a shared pool of worker systems. In various embodiments, driver systems are allocated on a customer basis, on a user basis but within a customer limit, on a no boundary basis (e.g., customers share drivers, users share drivers, etc.), or any other appropriate allocation.

FIG. 1 is a block diagram illustrating an embodiment of a network system. In some embodiments, the network system of FIG. 1 comprises a system for executing a streaming query. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Administrator system 102, cluster computing system 104, storage system 106, and client system 108 communicate via network 100. In the example shown, administrator system 102 comprises an administrator system for use by an administrator. In various embodiments, administrator system 102 comprises an administrator system for executing administrator commands, for executing jobs using cluster computing system 104, for executing a streaming query on cluster computing system 104, for querying the status of jobs on cluster computing system 104, for storing data on storage system 106, for retrieving data from storage system 106, or for any other appropriate administrator system purpose. Cluster computing system 104 comprises a cluster computing system for executing cluster computing jobs. In some embodiments, cluster computing system 104 comprises a cluster computing system for executing a streaming query. In various embodiments, cluster computing system 104 comprises a computer, a multiprocessor computer, a plurality of computers, a plurality of multiprocessor computers, or any other appropriate cluster computing system. In some embodiments, cluster computing system 104 comprises a plurality of individual cluster systems. In some embodiments, one or more computers of cluster computing system 104 store data of cluster computing jobs on storage system 106. Storage system 106 comprises a storage system for storing data. In some embodiments, storage system 106 comprises a database system. In some embodiments, storage system 106 comprises a distributed storage system. Client system 108 comprises a client system for use by a cluster computing system client. A cluster computing system client requests jobs on cluster computing system 104 via client system 108. In some embodiments, a plurality of clients request jobs via a plurality of client systems to be executed by one or more cluster systems. In various embodiments, individual clients or users are assigned individual cluster systems, individual clients or users are assigned individual computers within a cluster system, individual clients or users share computers within a cluster system, individual clients or users are allocated on a customer basis, individual clients or users are allocated on a user basis but within a customer limit, individual clients or users are allocated on a no boundary basis (e.g., customers share drivers, users share drivers, etc.), or individual users or clients are divided among cluster systems in any other appropriate way.

Figure 2:
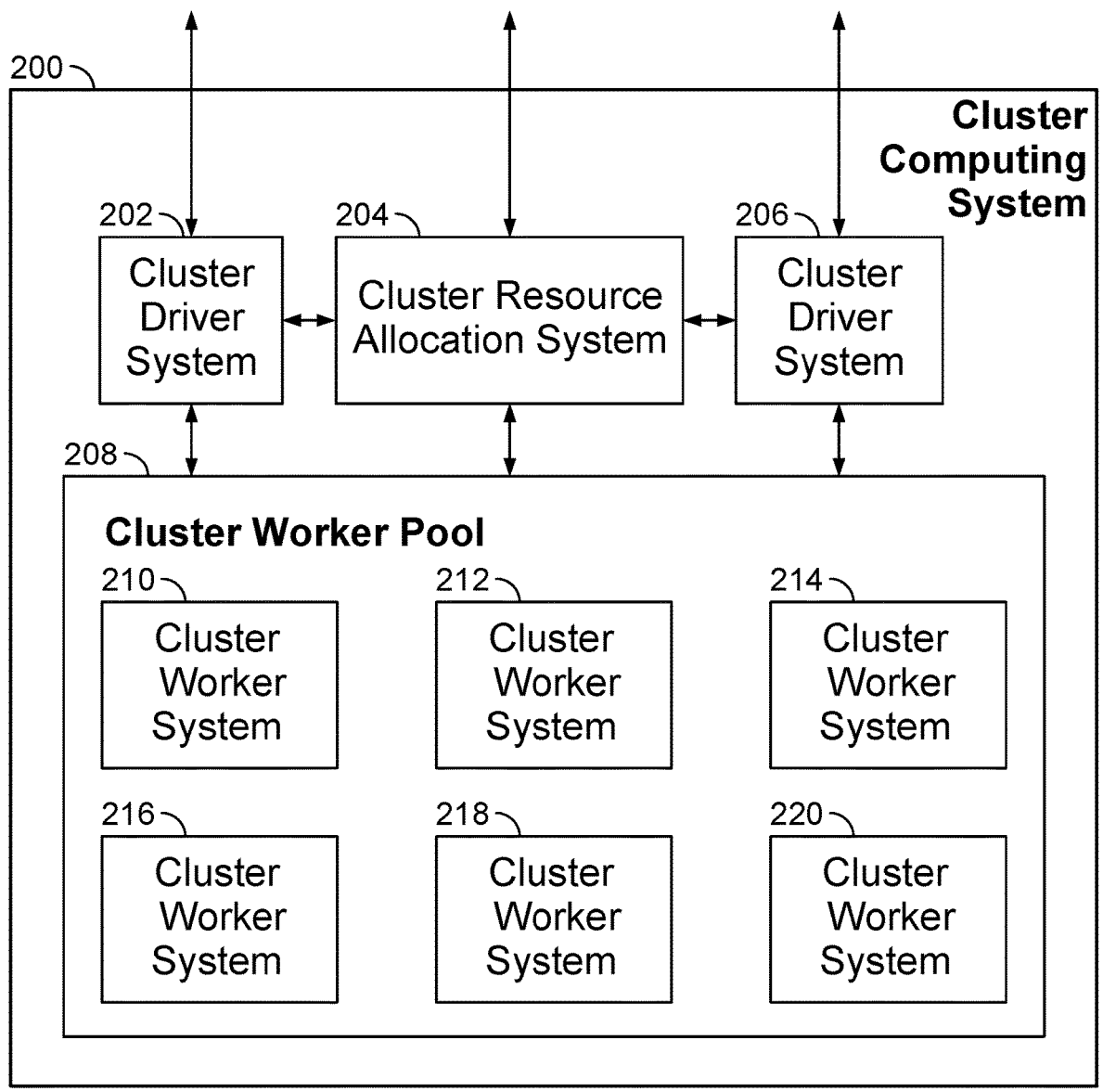
FIG. 2 is a block diagram illustrating an embodiment of a cluster computing system.

FIG. 2 is a block diagram illustrating an embodiment of a cluster computing system. In some embodiments, cluster computing system 200 implements cluster computing system 104 of FIG. 1. In the example shown, cluster computing system 200 comprises cluster resource allocation system 204. Cluster resource allocation system 204 comprises a system for allocating cluster resources. In some embodiments, cluster resource allocation system 204 comprises a system for allocating cluster resources (e.g., one or more cluster worker systems, memory, processing capacity, storage, a cluster driver system, etc.) to a cluster computing job (e.g., a job received from a client system). In some embodiments, cluster resource allocation system 204 automatically determines cluster resources to allocate to a cluster computing job. In some embodiments, cluster resource allocation system 204 monitors a process to determine whether a share of resources being used is greater than the allocated share of resources being used. In various embodiments, cluster resource allocation system 204 indicates to add additional resources to a job, to reduce a second process share of resources associated with a second job, to kill at least part of a job, or to adjust a share of resources in any other appropriate way. Cluster driver system 202 and cluster driver system 206 comprise cluster driver systems for receiving cluster computing jobs and assigning portions of cluster computing jobs to cluster worker systems. A cluster driver system receives a job and a resource allocation from cluster resource allocation system 204 and allocates resources (e.g., cluster worker systems) from cluster worker pool 208 to execute the job. In the example shown, cluster computing system 200 comprises two cluster driver systems (cluster driver system 202 and cluster driver system 206). In various embodiments, cluster computing system 200 comprises 1, 2, 3, 5, 8, 22, or any other appropriate number of driver systems comprising one driver system per user, one driver system per client, two driver systems per client, two driver systems for all users, 5 driver systems for all users, or driver systems assigned to users in any other appropriate way. Cluster worker pool 208 comprises a plurality of cluster worker system (e.g., cluster worker system 210, cluster worker system 212, cluster worker system 214, cluster worker system 216, cluster worker system 218, and cluster worker system 220). In various embodiments, cluster worker pool 208 comprises 2, 6, 10, 20, 100, or any other appropriate number of cluster worker systems.

Figure 3:
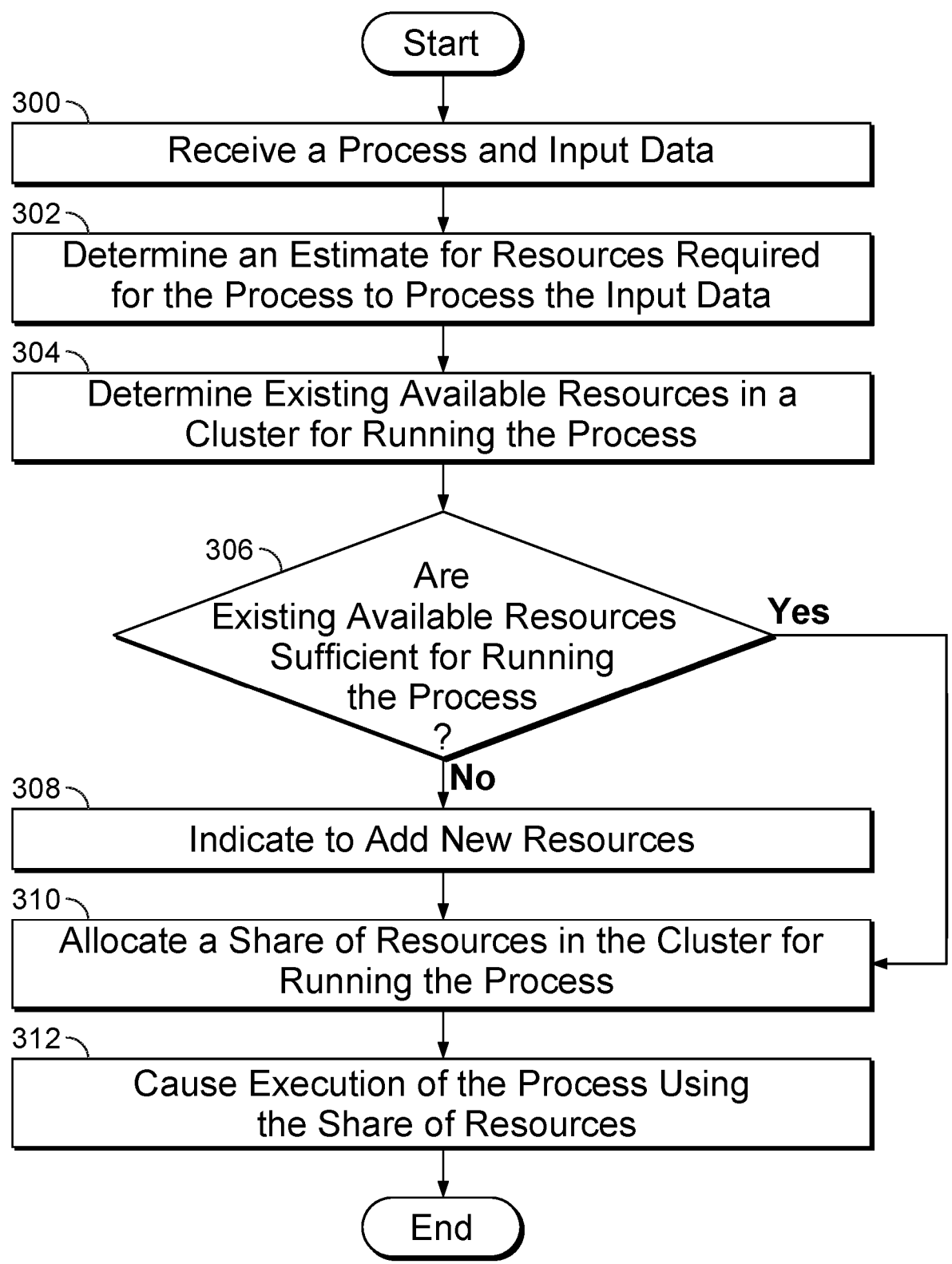
FIG. 3 is a flow diagram illustrating an embodiment of a process for cluster resource allocation.

FIG. 3 is a flow diagram illustrating an embodiment of a process for cluster resource allocation. In some embodiments, the process of FIG. 3 is executed by cluster resource allocation system 204 of FIG. 2. In the example shown, in 300, a process and input data are received. In 302, an estimate for resources required for the process to process the input data is determined. In various embodiments, the estimate is based on an algorithm type, on an algorithm implementation, on historical data, or on any other appropriate information. In 304, existing available resources in a cluster for running the process are determined. In various embodiments, resources comprise cluster worker machines, processors, memory, storage, or any other appropriate resources. In various embodiments, determining existing available resources in a cluster for running the process comprises determining resources that are not allocated to other processed, determining resources that are not currently being used by other processes, determining estimated required resources for other processes, or determining any other appropriate existing available resources. In 306, it is determined whether existing resources are sufficient for running the process. In the event it is determined that existing resources are sufficient for running the process, control passes to 310. In some embodiments, the process additionally determines whether existing available resources are more than sufficient for running the process, and in the event it is determined that existing available resources are more than sufficient for running the process, it is indicated to remove resources. In the event it is determined in 306 that existing resources are not sufficient for running the process, control passes to 308. In 308, the process indicates to add new resources (e.g., to add cluster worker machines to a cluster, to bring up a new cluster, to request more storage, etc.). In some embodiments, the process indicates to add new resources if possible (e.g., if not limited because of hardware constraints, other allocation constraints, etc.). Control then passes to 310. In 310, a share of resources in the cluster for running the process is allocated. In various embodiments, the share of resources is allocated by dividing the cluster resources evenly among users, by dividing the cluster resources according to a predetermined user allocation, by allocating an equal share for each running process, by allocating proportionally to an allotted portion amount (e.g., 2 portions gets double the resources of 1 portion, 3 portions gets triple the resources of 1 portion, etc.), allocating a maximum amount of cluster resources, or in any other appropriate way. In various embodiments, the allocated share of resources comprises an amount of resources, a fraction of resources, a resource priority, or any other appropriate resource allocation. In 312, execution of the process is caused using the share of resources.

Figure 4:
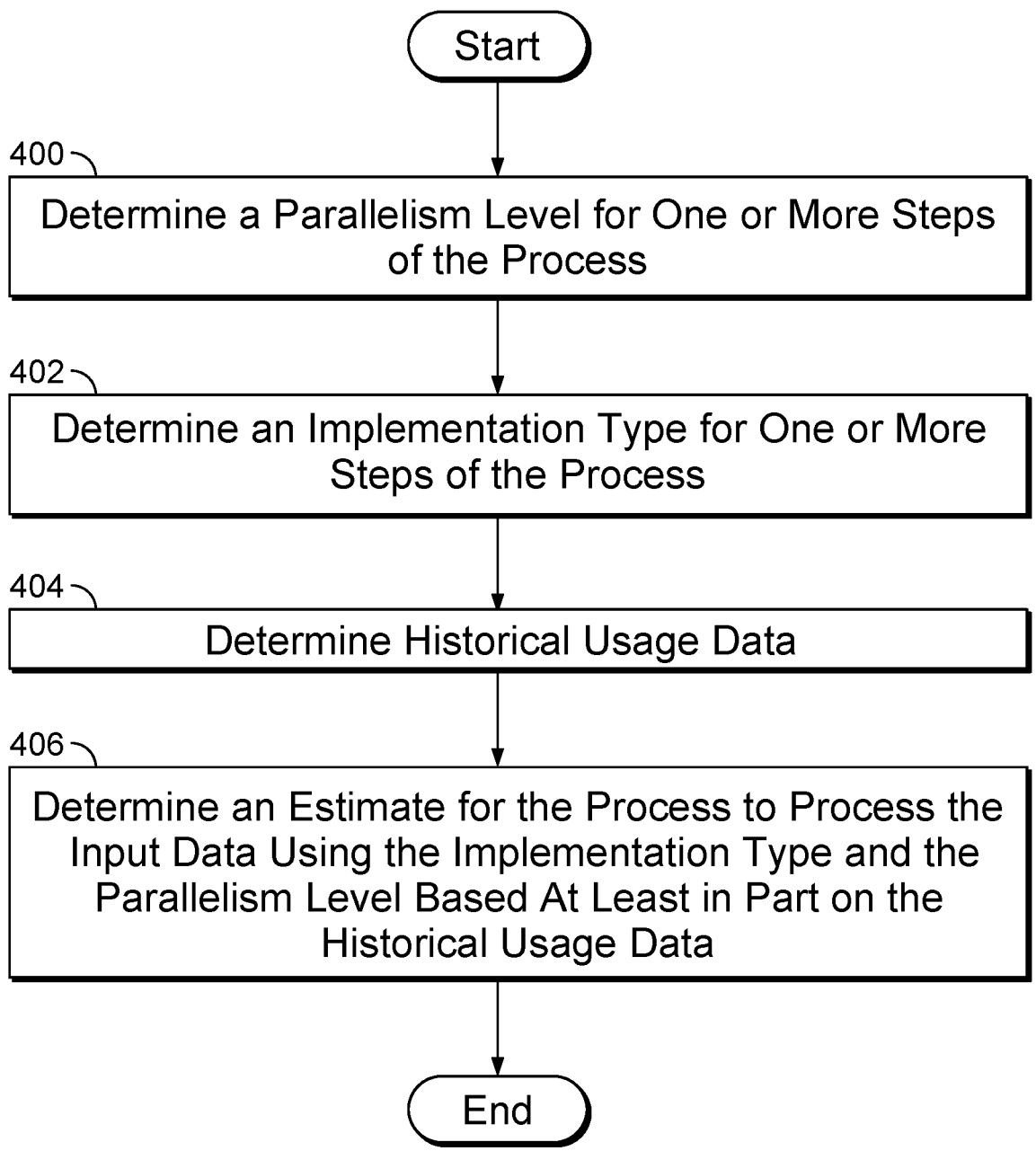
FIG. 4 is a flow diagram illustrating an embodiment of a process for determining an estimate for resources required for the process to process input data.

FIG. 4 is a flow diagram illustrating an embodiment of a process for determining an estimate for resources required for the process to process input data. In some embodiments, the process of FIG. 4 implements 302 of FIG. 3. In the example shown, in 400, a parallelism level is determined for one or more steps of the process. In various embodiments, a parallelism level comprises a quantity of data per cluster worker, a number of cluster workers, a quantity of data per processor, or any other appropriate parallelism level. In some embodiments, parallelizing of job or process is achieved based on input files—for example, job or process is parallelized by input file (each file is processed in parallel to other files), by grouping input files (groups of files are made and the groups are processed in parallel), or by taking pieces of input files (groups are made of segments of files and/or files and/or groups of files and the ground parallelizing input data based on the segmentation of input data of the file(s). In 402, an implementation type is determined for one or more steps of the process. In various embodiments, an implementation type comprises a sort algorithm, a join algorithm, a filter algorithm, or any other appropriate implementation type. In 404 historical usage data is determined. In 406, an estimate for the process is determined to process the input data using the implementation type and the parallelism level based at least in part on the historical usage data. In some embodiments, estimate for the process is determined not using historical usage data. In some embodiments, estimate for the process is determined based on known periodic jobs or processes.

Figure 5:
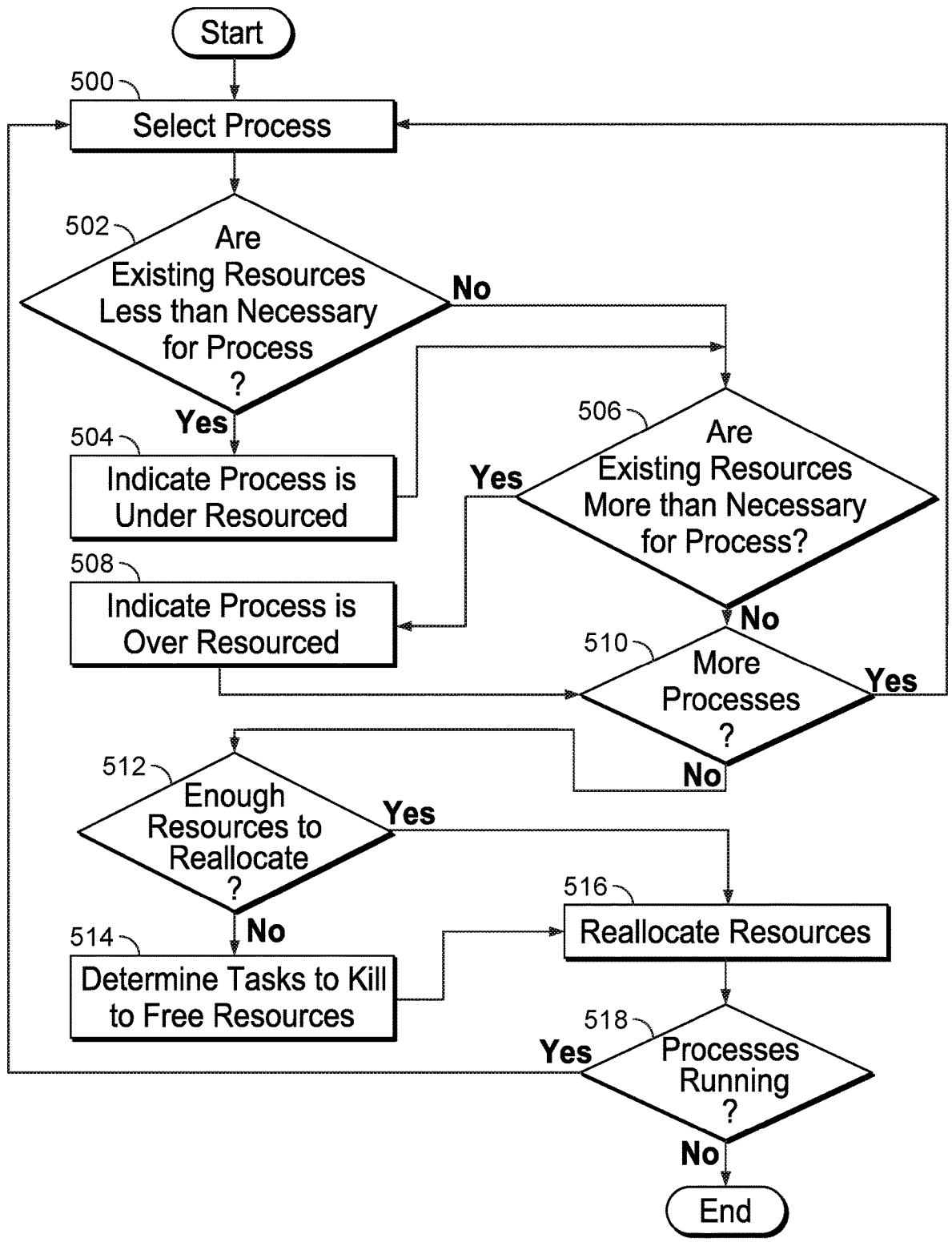
FIG. 5 is a flow diagram illustrating an embodiment of a process for reallocating resources.

FIG. 5 is a flow diagram illustrating an embodiment of a process for monitoring and reallocating resources. In some embodiments, the process of FIG. 5 is executed by 204 of FIG. 2. In the example shown, in 500, a process is selected. For example, one executing job or process is selected. In 502, it is determined whether there are existing resources less than necessary for the process. In the event that there are existing resources less than necessary for the process, then in 504 it is indicated that the process is under resourced, and control passes to 506. In the event that there are not less than existing resources less than necessary for the process, then control passes to 506. In 506, it is determined whether there are existing resources more than necessary for the process. In the event that there are existing resources more than necessary for the process, then in 508 it is indicated that the process is over resourced, and control passes to 510. In the event that there are not more than necessary resources for the process, then control passes to 510. In 510, it is determined whether there are more processes. In the event that there are more processes, control passes to 500. In the event that there are not more processes, then control passes to 512. In 512, it is determined whether there are enough resources to reallocate. For example, it is determined whether the over resources are enough to redistribute and fulfill the need of indicated as under resourced. In the event that there is not enough resources to reallocate, then in 514 it is determined the tasks to kill to free resources and control passes to 516. In various embodiments, the task(s) is/are selected to be killed using a random selection, a highest resource hog selection, a newest process selection, or any other appropriate process selection methodology. In the event that there is enough resources to reallocate, then in 516 resources are reallocated and control passes to 518. In 518, it is determined whether there are more processes running. In the event that there are more processes running, control passes to 500. In the event that there are not more processes running, then the process ends.

Figure 6:
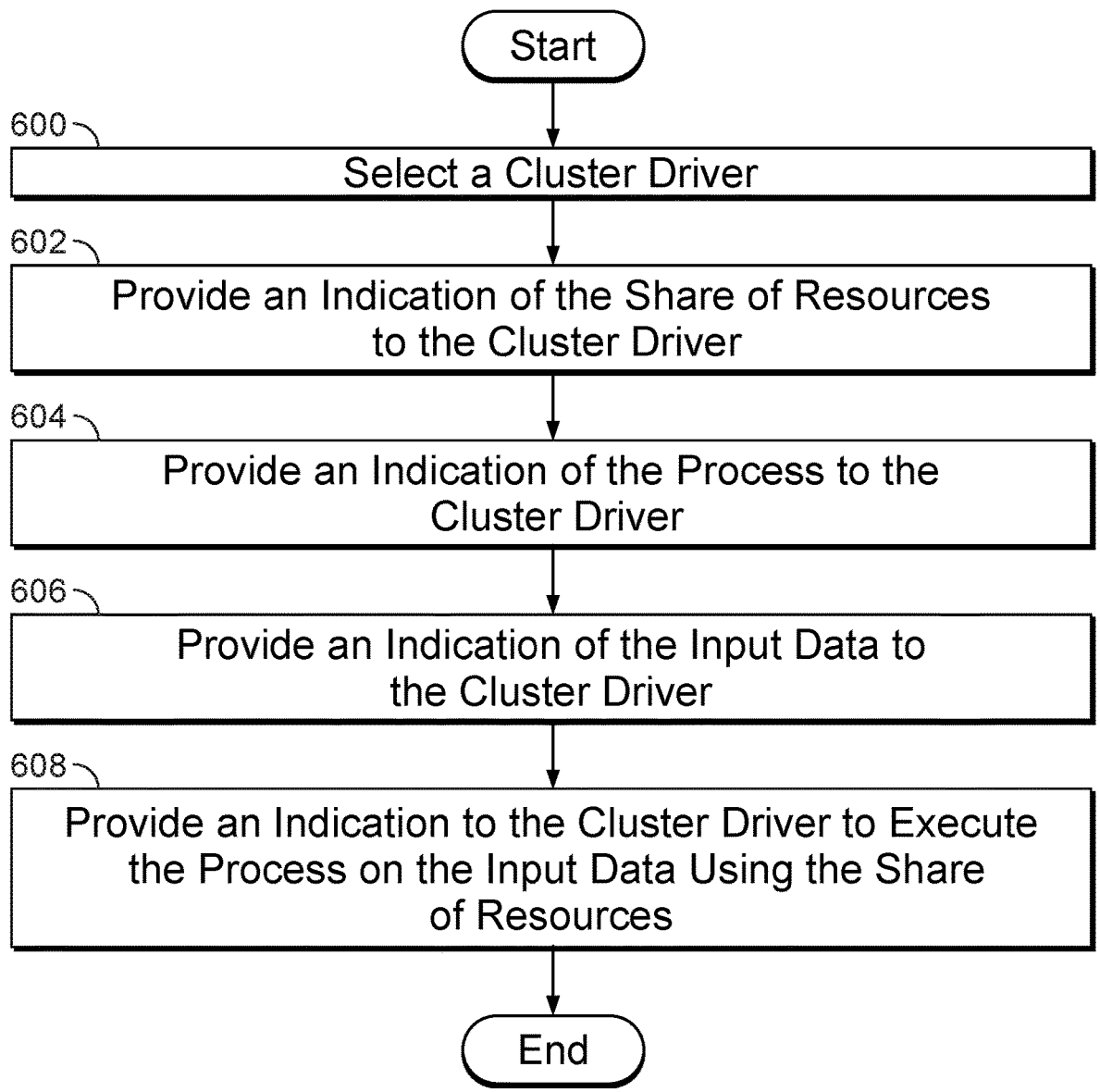
FIG. 6 is a flow diagram illustrating an embodiment of a process for causing execution of a process using a share of resources.

FIG. 6 is a flow diagram illustrating an embodiment of a process for causing execution of a process using a share of resources. In some embodiments, the process of FIG. 6 implements 312 of FIG. 3. In the example shown, in 600, a cluster driver is selected. In various embodiments, the cluster driver comprises a cluster driver associated with the user executing the process, a cluster driver associated with the organization associated with the user executing the process, one of a set of cluster drivers associated with a user or organization, one of a set of cluster drivers available to all users, or any other appropriate cluster driver. In 602, an indication of the share of resources is provided to the cluster driver. In 604, an indication of the process is provided to the cluster driver. In 606, an indication of the input data is provided to the cluster driver. In 608, an indication is provided to the cluster driver to execute the process on the input data using the share of resources.

Figure 7:
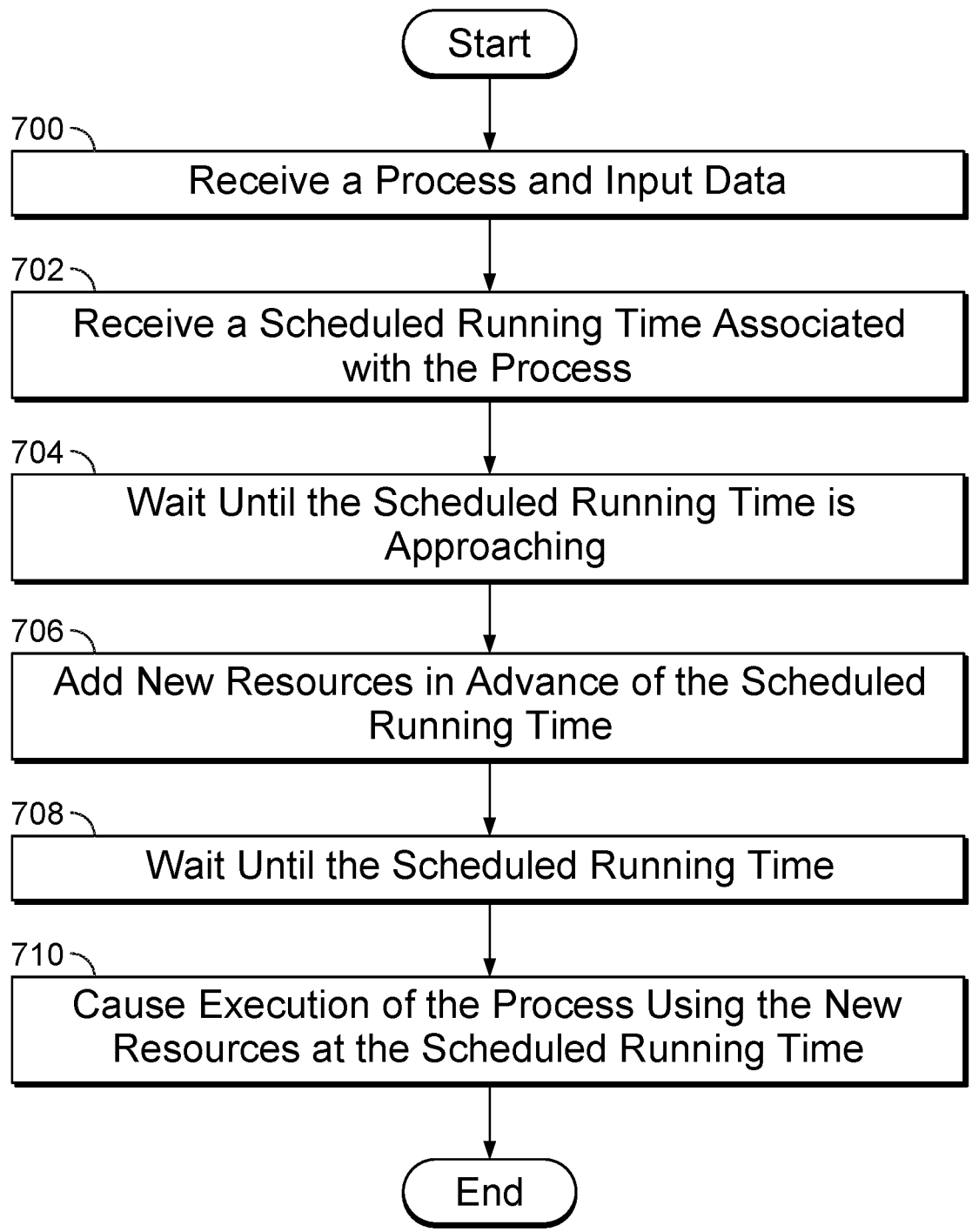
FIG. 7 is a flow diagram illustrating an embodiment of a process for cluster resource allocation for a scheduled process.

FIG. 7 is a flow diagram illustrating an embodiment of a process for cluster resource allocation for a scheduled process. In some embodiments, the process of FIG. 7 is executed by cluster resource allocation system 204 of FIG. 2. In the example shown, in 700, a process and input data are received. In 702, a scheduled running time associated with the process is received. In 704, the process waits until the scheduled running time is approaching (e.g., 1 second before the scheduled running time, 1 minute before the scheduled running time, 1 hour before the scheduled running time, etc.). In 706, new resources are added in advance of the scheduled running time. In 708, the process waits until the scheduled running time. In 710, execution of the process is caused, using the new resources, at the scheduled running time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for cluster resource allocation, comprising:
an interface configured to:
receive a process and input data; and
a processor configured to:
determine an estimate for resources required for the process to process the input data, comprising to:
determine a parallelism level for one or more steps of the process, the parallelism level including a quantity of data per cluster worker, a number of cluster workers, or a quantity of data per processor;
determine an implementation type for one or more steps of the process, the implementation type including a sort algorithm, a join algorithm, or a filter algorithm; and
determine, based on historical usage data, the estimate for resources required for the process using the parallelism level and the implementation type;
determine existing available resources in a cluster for running the process;

determine whether the existing available resources are sufficient for running the process based at least in part on the estimate for resources required;

in response to determining that the existing available resources are not sufficient for running the process, indicate to add new resources to a cluster;

determine an allocated share of resources in the cluster for running the process;

cause execution of the process using the allocated share of resources, comprising to:

provide an indication of the share of resources, the process, and the input data to a cluster driver; and provide an indication to the cluster driver to execute the process of the input data using the share of resources.

2. The system of claim 1, wherein determining existing available resources in a cluster for running the process comprises determining resources that are not allocated to other processes.

3. The system of claim 1, wherein determining existing available resources in a cluster for running the process comprises determining resources that are not currently being used by other processes.

4. The system of claim 1, wherein determining existing available resources in a cluster for running the process comprises determining the estimated required resources for other processes running in the cluster.

5. The system of claim 1, wherein the estimate for resources required for the process to process the input data is based at least in part on one or more of the following: the process, the input data, or the historical usage data.

6. The system of claim 1, wherein the processor is further configured to:

in response to determining that the existing available resources are not sufficient for running the process, indicate to add new resources if possible.

7. The system of claim 1, wherein the processor is further configured to:

in response to determining that the existing available resources are more than sufficient for running the process, indicate to remove resources.

8. The system of claim 1, wherein the process comprises an associated scheduled running time.

9. The system of claim 8, wherein the processor is further configured to:

in response to determining that the existing available resources are not sufficient for running the process, indicate to add new resources in advance of the scheduled running time.

10. The system of claim 1, wherein the allocated share of resources in the cluster comprises one or more of the following: a share determined by dividing the cluster resources evenly among users, a share determined by dividing the cluster resources according to a predetermined user allocation, an equal share for each running process, or a maximum amount of cluster resources.

11. The system of claim 1, wherein the allocated share of resources comprises one or more of the following: a number of worker machines, a number of processors, a number of processes, an amount of memory, a number of disks, a number of virtual machines, or a number of containers.

12. The system of claim 1, wherein the allocated share of resources comprises one of the following: an amount of resources, a fraction of resources, or a priority.

13. The system of claim 1, wherein the processor is further configured to:

determine that the share of resources being used is greater than the allocated share of resources.

14. The system of claim 13, wherein the processor is further configured to:

reduce a second process share of resources associated with a second process.

15. The system of claim 14, wherein the second process share of resources associated with the second process is not reduced below a threshold share.

16. The system of claim 13, wherein the processor is further configured to:

indicate to add resources.

17. The system of claim 16, wherein resources are limited to a customer maximum allocation.

18. The system of claim 1 wherein the driver is shared between users of a customer.

19. The system of claim 1 wherein the driver is shared between users of different customers.

20. The system of claim 1, wherein the threshold comprises one or more of a percentage of the allocated resources or a number of resources.

21. A method for cluster resource allocation, comprising:

receiving a process and input data;

determining, using a processor, an estimate for resources required for the process to process the input data, comprising:

determining a parallelism level for one or more steps of the process, the parallelism level including a quantity of data per cluster worker, a number of cluster workers, or a quantity of data per processor;

determining an implementation type for one or more steps of the process, the implementation type including a sort algorithm a join algorithm or a filter algorithm; and determining, based on historical usage data, the estimate for resources required for the process using the parallelism level and the implementation type;

determining existing available resources in a cluster for running the process;

determining whether the existing available resources are sufficient for running the process based at least in part on the estimate for resources required;

in response to determining that the existing available resources are not sufficient for running the process, indicating to add new resources to a cluster;

determining an allocated share of resources in the cluster for running the process;

causing execution of the process using the allocated share of resources, comprising:

providing an indication of the share of resources, the process, and the input data to a cluster driver; and providing an indication to the cluster driver to execute the process of the input data using the share of resources.

22. A computer program product for cluster resource allocation, the computer program product being embodied in a non-transitory computer readable storage medium and comprising computer instructions for:

receiving a process and input data;

determining an estimate for resources required for the process to process the input data, comprising:

determining a parallelism level for one or more steps of the process, the parallelism level including a quantity of data per cluster worker, a number of cluster workers, or a quantity of data per processor;

determining an implementation type for one or more steps of the process, the implementation type including a sort algorithm a join algorithm or a filter algorithm; and determining, based on historical usage data, the estimate for resources required for the process using the parallelism level and the implementation type;

determining existing available resources in a cluster for running the process;

determining whether the existing available resources are sufficient for running the process based at least in part on the estimate for resources required;

in response to determining that the existing available resources are not sufficient for running the process, indicating to add new resources to a cluster;

determining an allocated share of resources in the cluster for running the process;

causing execution of the process using the allocated share of resources, comprising:

providing an indication of the share of resources, the process, and the input data to a cluster driver; and providing an indication to the cluster driver to execute the process of the input data using the share of resources.

* * * * *